United States Patent Office 2,764,590
Patented Sept. 25, 1956

2,764,590

CERTAIN 4,4'-DISUBSTITUTED-DIPHENYL-PYRIDYL METHANES AND PROCESS

August Kottler and Ernst Seeger, Biberach (Riss), Germany, assignors to Dr. Karl Thomae G. m. b. H., Biberach (Riss), Germany, a firm No Drawing. Application March 16, 1953,
Serial No. 342,716

Claims priority, application Germany March 17, 1952

7 Claims. (Cl. 260—295)

The present invention relates to a process for the production of 4,4'-dihydroxy-diphenyl-pyridyl-methanes or their O-acylated or O-alkylated derivatives. These compounds are new and are distinguished by valuable therapeutic properties, more particularly they are valuable laxatives and disinfectants.

It is known, that diphenyl-(pyridyl-2)-methane, the unsubstituted parent substance of the compounds according to the invention, is obtained, by reacting diphenyl-bromomethane with pyridine to form pyridinium-(diphenylmethyl)-bromide and heating the latter (vide Tschitschibabin, J. Russ. phys. chem. Ges. 34, 133; C. 1902/I, 1301). By reduction of the corresponding carbinols this diphenyl-(pyridyl-2)-methane can likewise be obtained, as well as the diphenyl-(pyridyl-4)-methane [vide Tschitschibabin and Benewolenskaja, B. 61, 547 (1928)]. Furthermore a few pyridine analogues of amino-triphenyl-methane dyestuffs have become known. Harries and Lénart have further described the production of di-(p-dimethyl-amino-phenyl)-(pyridyl-2)-methane [vide A. 410, 95 (1915)]. A short while ago Kausche, Hahn and Schleith [vide Z. f. Naturforschg. 5b, 89 (1950)] reported on the same compound.

According to the invention 4,4'-dihydroxy-diphenyl-pyridyl-methanes or their O-acylated or O-alkylated derivatives are obtained in homogeneous, readily crystallizable form in excellent yields, by condensing pyridine aldehydes or pyridine ketones with phenols which have a hydrogen atom in the p-position, which permits condensation in the presence of dehydrating agents.

A particularly advantageous manner of carrying out the process according to the invention consists in using as reaction components instead of the pyridine aldehydes or pyridine ketones, their acetals or the bisulphite addition compounds or the free acids corresponding to these bisulphite addition compounds which are sometimes referred to in the art as "hydroxymethane sulphonic acids" [vide e. g. Mathes and Sauermilch, B. 84, 648 (1951)]. In this way the advantage results that starting materials can be used, which are nonreactive as compared with the pyridine aldehydes or the pyridine ketones, for the former tend to autoxidize and discolorations can occur with the latter.

Sulphuric acid, phosphoric acid, hydrochloric acid, zinc chloride, tin tetrachloride, phosphorus halides, aluminum chloride and the like are suitable as dehydrating agents.

The condensation can if desired also be carried out in the presence of solvents, such as benzene, toluene and the like. One operates preferably at room temperature. However, it may be advisable to carry the condensation out also with cooling or gentle warming and stirring.

Polyhydroxy phenols can also be used as starting material in the process according to the invention. The hydroxyl groups can be partially acylated or alkylated in both monovalent and polyvalent phenols. The acylation or alkylation of the hydroxyl groups can if desired take place during or after the condensation. If the hydroxyl groups are to be esterified with acetic acid, then for example phenol acetate can be used for the condensation or the free phenol may be condensed in the presence of acetic anhydride for example with anhydrous phosphoric acid, whereby simultaneous esterification results. However the free 4,4'-dihydroxy compound can also be subsequently acetylated.

The phenols used for the process according to the invention can be substituted in the ring with alkyl, aryl or aralkyl groups.

It has been found further that the process, according to the invention can also be carried out by condensing the pyridine aldehydes or pyridine ketones or their acetals or bisulphite addition compounds or the free acids corresponding to the bisulphite addition compounds, with the amino compounds corresponding to the phenols, the amino groups being subsequently converted into hydroxyl groups e. g. by diazotization and heating of the diazonium compound. If desired the hydroxyl groups can subsequently be acylated or alkylated. The amines used instead of phenols can, like the phenols be substituted in the ring with alkyl, aryl or aralkyl groups.

Thus the corresponding amino compounds, namely aniline, m-toluidine, o-toluidine or 1-amino-2-methoxybenzene can be used as reaction components instead of phenol, m-cresol, o-cresol or guaiacol.

The 4,4'-diamino-diphenyl-pyridyl-methanes resulting in this manner are obtained in good yields, if pyridine aldehydes or pyridine ketones or their acetals or bisulphite addition compounds or the free acids corresponding to these bisulphite addition compounds are condensed with aniline or aniline substituted in the ring in the presence of dehydrating agents.

Hydrochloric acid is preferably used as condensation agent, but zinc chloride, tin tetrachloride, phosphoric acid, sulphuric acid, phosphorus halides and the like are also suitable. The condensation preferably takes place at temperatures between 100 and 125° C., if desired in the presence of solvents, such as toluene, xylene etc.

The new 4,4'-diamino-diphenyl-pyridyl-methanes produced according to the process of the invention differ from the known compounds [vide e. g. Harries and Lénart, A 410, 95 (1915); Kahn, Petrov, Wien and Harrison, J. Chem. Soc. London 858 (1945)] in that they contain primary amino groups instead of tertiary amino groups. These new diamino compounds are useful not only for the production of the corresponding hydroxy compounds, but they are themselves also valuable intermediate products for the production of pharmaceutical preparations.

Apart from unsubstituted pyridine aldehydes or pyridine ketones or their acetals or bisulphite addition compounds or the acids corresponding to these bisulphite addition compounds, such compounds substituted in the pyridine ring with alkyl, aryl or aralkyl groups are also suitable for carrying out the process according to the invention.

The carrying out of the process according to the invention will now be more clearly explained by means of the following examples.

EXAMPLE 1

(4,4'dihydroxy-diphenyl)-(pyridyl-2)-methane

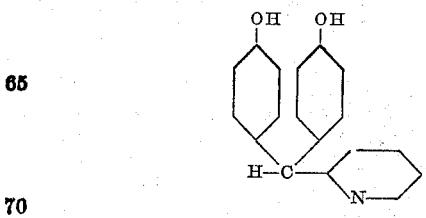

70.0 g. of α-pyridine aldehyde are fed portionwise with stirring and cooling to a mixture of 200 g. of phenol and 100 ccs. of conc. sulphuric acid. The reaction mixture is allowed to stand for a while with repeated stirring, whereby it becomes syrupy, neutralized with sodium carbonate, dissolved in methanol and filtered. The filtrate is introduced into a large quantity of water and the resulting precipitate is recrystallised from a methanol/water mixture. Colourless crystals are obtained of M. P. 254° C.

When using zinc chloride or tin tetrachloride and warming to a temperature of about 50° C., a corresponding result is obtained.

EXAMPLE 2

(4,4'-dihydroxy-2,2'-dimethyl-diphenyl)-(pyridyl-2)-methane

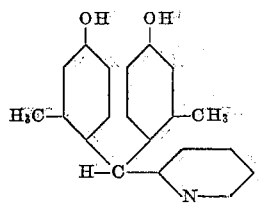

To a mixture of 150 g. of m-cresol and 50 ccs. of conc. phosphoric acid are added whilst stirring 50 g. of α-pyridine aldehyde. After standing for one day the syrup-like substance is dissolved in methanol and diluted with water. After neutralizing with sodium carbonate the precipitate is filtered off with suction and washed with water. For purification it is dissolved in 5% caustic soda diluted with water, dilute hydrochloric acid added to a weak acid reaction, neutralized the excess with sodium carbonate, the precipitate filtered off and re-crystallized from aqueous methanol. Colourless crystals are obtained with M. P. 247° C.

The same compound is obtained, when using phosphorus pentoxide or phosphorus trichloride instead of phosphoric acid.

EXAMPLE 3

(4,4'-dihydroxy-3,3'-dimethyl-diphenyl)-(pyridyl-2)-methane

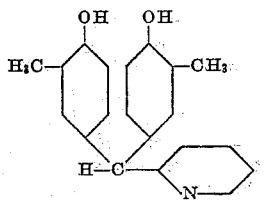

One proceeds as described in Example 1, using o-cresol for the reaction. Colourless crystals are thus obtained, M. P. 206° C.

EXAMPLE 4

(4,4'-dihydroxy-3,3'-diisopropyl-6,6'-dimethyl-diphenyl)-(pyridyl-2)-methane

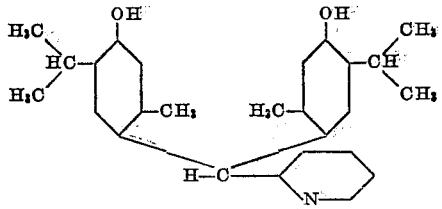

80 ccm. concentrated sulfuric acid is added to 60 g. thymol and 40 g. pyridine-2-aldehyde with stirring and cooling. The mixture is allowed to stand for some time, then water is added and the mixture is introduced into a sodium carbonate solution, whereby a precipitate results, which is filtered off by suction and washed with water. For purification, the product is dissolved and reprecipitated with diluted caustic soda solution, the dried precipitate is dissolved in a small quantity of methanol, precipitated with ether and recrystallized from methanol/acetone. Colourless crystals, M. P. 251° C.

EXAMPLE 5

(4,4'-dihydroxy-3,3'-diphenyl-diphenyl)-(pyridyl-2)-methane

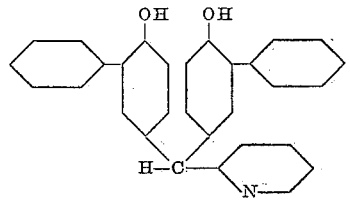

To a mixture of 150 g. 2-hydroxy-diphenyl and 45 g. pyridine-2-aldehyde 90 ccm. conc. sulfuric acid is added with cooling, and the mixture is allowed to stand for several hours and is repeatedly stirred during this period. The solidified reaction product is dissolved in methanol and introduced into a sodium carbonate solution whereby a precipitate results which is filtered off by suction and treated with a small quantity of cold ethanol and then recrystallized from hot ethanol. Colourless crystals, M. P. 188–190° C. (dec.).

EXAMPLE 6

(4,4'-dihydroxy-3,3'-dibenzyl-diphenyl)-(pyridyl-2)-methane

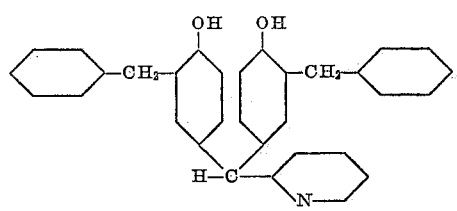

To a mixture of 175 g. o-benzylphenol and 50 g. pyridine-2-aldehyde 125 ccm. conc. sulfuric acid is added with stirring and cooling; the mixture is allowed to stand for some hours and is then warmed for another hour to a temperature of 40–50° C. Then, the product is dissolved in methanol, is neutralized with a sodium carbonate solution and the resulting precipitate is filtered off by suction. To purify the product, it is treated with a small quantity of hot methanol and recrystallized from ethanol. Colourless crystals, M. P. 195° C.

EXAMPLE 7

(4,4'-dihydroxy-diphenyl)-(pyridyl-3)-methane

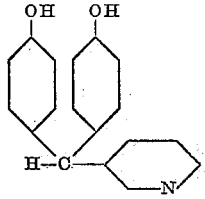

Hydrochloric acid gas is introduced with cooling and stirring into a solution of 50 g. of β-pyridine aldehyde and 120 g. of phenol in 400 ccs. of benzene. After several days standing and subsequent evaporation of the benzene, add water to the residue and neutralize with sodium carbonate. The precipitated oily substance is triturated with a little cold methanol and filtered off with suction. For purification it is recrystallized from aqueous methanol. Colourless crystals M. P. 238° C. are obtained.

EXAMPLE 8

(4,4'-dihydroxy-diphenyl)-(pyridyl-3)-methyl-methane

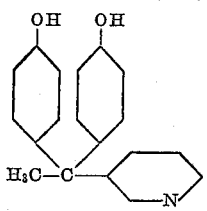

To 100 g. of methyl-β-pyridine ketone are added 230 g. of phenol and, whilst stirring 200 ccs. of conc. sulphuric acid. After standing for some time the reaction mixture is dissolved in methanol, water is added and neutralized with sodium carbonate. The precipitate is recrystallized from aqueous methanol. Colourless crystals, M. P. 216° C. are obtained.

EXAMPLE 9

(4,4'-dimethoxy-diphenyl)-(pyridyl-2)-methane

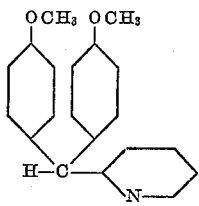

To 50 g. pyridine-2-aldehyde and 100 g. anisole are added 150 ccm. conc. sulfuric acid with stirring and cooling and the mixture is allowed to stand for some hours while repeatedly stirring. Then, the product of the reaction is introduced into water, the obtained solution is several times agitated with ether to remove the anisole, and is neutralized with sodium carbonate. The resulting precipitate is dissolved in ether, separated from insoluble impurities by filtration, and then distilled. The product is an oil having a boiling point at 0.15 mm. of 200°–203° C. The yield is 57 g.

EXAMPLE 10

(4,4'-dihydroxy-3,3'-dimethoxy-diphenyl)-(pyridyl-2)-methane

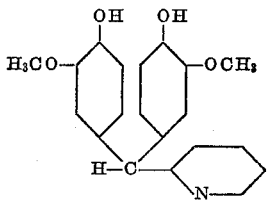

50 ccs. of conc. sulphuric acid are introduced into a mixture of 50 g. of α-pyridine aldehyde and 150 g. of guaiacol. After standing for a while the substance is dissolved in 5% caustic soda and diluted with water. The crude product is precipitated by passing through carbon dioxide, and is purified by recrystallization from aqueous methanol. Colourless crystals, M. P. 174° C. are obtained.

EXAMPLE 11

(4,4'-dihydroxy-diphenyl)-(pyridyl-4)-methane

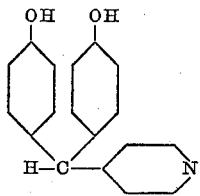

The mixture of 100 g. of γ-pyridine aldehyde, 400 g. of phenol and 150 ccs. of sulphuric acid is left to stand for some time with occasional stirring and then introduced into sodium carbonate solution. The precipitate which thus results is triturated with cold methanol and recrystallized from hot aqueous methanol. Colourless crystals, M. P. 261° C. (dec.) are obtained.

EXAMPLE 12

(4,4'-dihydroxy-diphenyl)-(6-methyl-pyridyl-3)-methyl-methane

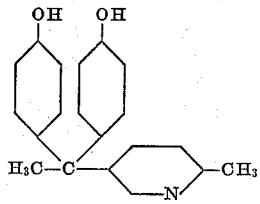

To 25 g. of 2-methyl-5-acetyl-pyridine are added 80 g. of phenol and portionwise with stirring 60 ccs. of conc. sulphuric acid. After several hours standing the viscous reaction product is dissolved in methanol, diluted with water and the substance precipitated by adding sodium carbonate. Colourless crystals of M. P. 256° C. are obtained by recrystallization from aqueous methanol.

EXAMPLE 13

(4,4'-diacetoxy-diphenyl)-(pyridyl-2)-methane

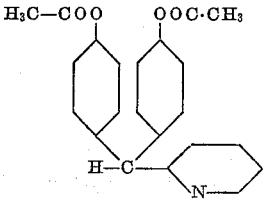

5 g. of (4,4'-dihydroxy-diphenyl)-(pyridyl-2)-methane are heated with 5 g. of anhydrous sodium acetate and 20 ccs. of acetic anhydride for three hours over a boiling waterbath. The cooled reaction mixture is poured into water, whereby after a while a colourless substance precipitates, which is filtered off with suction, washed with water and recrystallized from aqueous ethanol. Colourless bright crystals, M. P. 138° C. are obtained.

EXAMPLE 14

(4,4'-dihydroxy-diphenyl)-(pyridyl-2)-methane 100 g. of pyridine-2-aldehyde-diethylacetal are mixed with 200 g. of phenol treated with stirring with 150 ccs. of concentrated sulphuric acid. The reaction mixture is allowed to stand for some time with frequent stirring; it is then dissolved in water, the acidity reduced with caustic soda and neutralized with sodium carbonate, whereby a colourless precipitate results, which is filtered off with suction, washed with water and treated with methanol. Colourless crystals, M. P. 254° C. are obtained.

EXAMPLE 15

(4,4'-dihydroxy-diphenyl)-(6-methyl-pyridyl-2)-methane 200 ccs. of concentrated sulphuric acid is run into a mixture of 100 g. of 6-methyl-pyridine-2-aldehyde-diethylacetal and 250 g. of phenol with stirring. After standing for a while the mass is introduced into a sodium carbonate solution. The precipitate is dissolved in methanol and precipitates again by introduction into water. For purification it is recrystallized from a mixture of methanol-ethanol. Colourless crystals, M. P. 239° C. are obtained.

EXAMPLE 16

(4,4'-dihydroxy-diphenyl)-(pyridyl-2)-methane 300 ccs. of concentrated sulphuric acid are introduced portionwise into a mixture of 200 g. of (pyridyl-2)-hydroxy-methane-sulphonic acid and 400 g. of phenol and the whole stirred for a few hours. After subsequent several hours' standing the reaction mixture is diluted with methanol and allowed to run into sodium carbonate solution. The colourless precipitate resulting therefrom is filtered off, with suction, washed with water and treated with methanol. Colourless crystals, M. P. 254° C. are thus obtained.

EXAMPLE 17

*(4,4'-dihydroxy-diphenyl)-(pyridyl-4)-methane*

100 g. of (pyridyl-4)-hydroxymethane-sulphonic acid are mixed with 200 g. of phenol and 250 g. of anhydrous phosphoric acid and heated for 3 hours at about 50° C. To complete the reaction the mixture is allowed to stand for some time, then dissolved in methanol and introduced into sodium carbonate solution. The precipitate is filtered off with suction, washed with water and recrystallized from methanol, whereby colourless crystals M. P. 261° C. precipitate.

EXAMPLE 18

*(4,4'-dihydroxy-diphenyl)-(pyridyl-2)-methyl-methane*

To 50 g. of sodium (pyridyl-2)-methyl-hydroxymethane-sulphonate are added 100 g. of phenol and then portionwise with stirring 150 ccs. of concentrated sulphuric acid. The reaction mixture is allowed to stand with frequent stirring for two days, then heated for 2 hours to 40–50° C., dissolved in methanol and, by introduction into sodium carbonate solution a colourless precipitate results, which produces from methanol/water colourless crystals M. P. 230° C.

EXAMPLE 19

(a) *(4,4'-diamino-diphenyl)-(pyridyl-2)-methane*

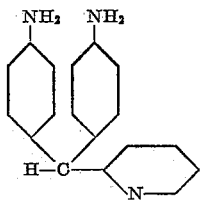

60 g. of pyridine-2-aldehyde, 120 g. of aniline and 200 ccs. of concentrated hydrochloric acid are heated for 8 hours in an oil bath under reflux, the temperature of the bath being maintained at about 150° C. After cooling the reaction mixture is diluted with water and neutralized by the addition of ammonia. The resulting precipitate is filtered off with suction, washed with water and, after drying, triturated first with ether and then repeatedly with 50% ethanol. After recrystallization with 50% ethanol colourless crystals M. P. 172° are obtained. The yield amounted to 128 g.

(b) *(4,4'-dihydroxy-diphenyl)-(pyridyl-2)-methane*

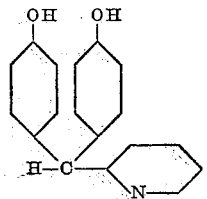

55 g. of (4,4'-diamino-diphenyl)-(pyridyl-2)-methane are dissolved in 1500 ccs. of 25% sulphuric acid and the solution heated to boiling. With vigorous stirring, 500 ccs. of a 10% sodium nitrite solution are allowed to flow slowly into the solution which is kept boiling and the heating is continued for a while. After cooling the acidity of the filtered solution is reduced with caustic soda and neutralized with sodium carbonate to yield a precipitate which is filtered off with suction and purified by reprecipitation from 5% caustic soda by means of dilute hydrochloric acid.

After recrystallization from methanol colourless crystals of M. P. 254° C. are obtained. The yield is 35 g.

EXAMPLE 20

*(4,4'-diamino-diphenyl)-(pyridyl-2)-methane*

A mixture of 30 g. of pyridine-2-aldehyde, 60 g. of aniline and 100 ccs. of 50% sulphuric acid is boiled for 6 hours under reflux. The reaction mixture is worked up as described in Example 19a. Colourless crystals M. P. 172° C. are obtained. The yield is 60 g.

EXAMPLE 21

*(4,4'-diamino-diphenyl)-(pyridyl-2)-methane*

A mixture of 35 g. of pyridyl-2-hydroxymethane sulphonic acid, 60 g. of aniline and 125 ccs. of 40% sulphuric acid is heated for 8 hours under reflux and then worked up as described in Example 19a. Yield 43 g.

Example 22

*(4,4'-diamino-diphenyl)-(pyridyl-2)-methane*

A solution of 25 g. of pyridine-2-aldehyde-diethylacetal, 50 ccs. of concentrated hydrochloric acid and 50 g. of aniline are kept at the boil for 8 hours under reflux and the reaction mixture worked up as described in Example 19a. The yield is 28 g.

Example 23

(a) *(4,4'-diamino-diphenyl)-(6-methyl-pyridyl-2)-methane*

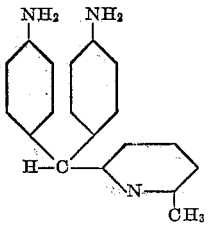

A mixture of 70 g. of 6-methyl-pyridine-2-aldehyde, 120 g. of aniline and 200 ccs. of concentrated hydrochloric acid are heated under reflux at boiling point for 8 hours. It is then diluted with water and a precipitate is obtained by adding dilute caustic soda which, after filtering off, is dissolved in hydrochloric acid and reprecipitated by adding sodium carbonate solution. After drying the crude product is repeatedly treated with ether and then with cold 50% ethanol. Colourless crystals of M. P. 186° C. are obtained by recrystallization from 50% ethanol. The yield amounted to 145 g.

(b) *(4,4'-dihydroxy-diphenyl)-(6-methyl-pyridyl-2)-methane*

A solution of 50 g. of (4,4'-diamino-diphenyl)-(6-methyl-pyridyl-2)-methane in 1500 ccs. of 25% sulphuric acid is treated as described in Example 19b. Colourless crystals of M. P. 239° C. are obtained after recrystallization from methanol/ethanol. The yield is 27 g.

What we claim is:

1. As new products 4,4'-disubstituted-diphenyl-pyridyl-methanes having the following structural formula:

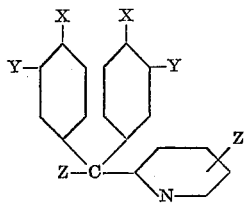

wherein X is a radical taken from the class consisting of hydroxy, methoxy, acetoxy and NH₂; Y is a radical taken from the class consisting of H, CH₃, C₃H₇, phenyl, benzyl and methoxy; and Z is a radical taken from the class consisting of H and CH₃.

2. As new compound (4,4'-dihydroxy-diphenyl)-(pyridyl-2)-methane:

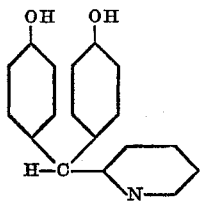

3. As new compound (4,4'-diacetoxy-diphenyl)-(pyridyl-2)-methane:

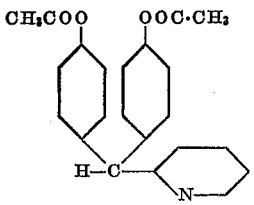

4. As new compound (4,4' - dihydroxy - diphenyl)-(6-methyl-pyridyl-2)-methane:

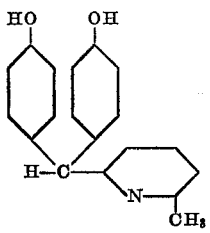

5. As new compound (4,4'-dihydroxy-3,3'-dimethyl-diphenyl)-(pyridyl-2)-methane:

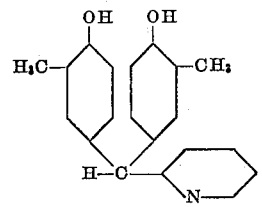

6. As new compound (4,4'-dihydroxy-diphenyl)-(pyridyl-2)-methyl-methane:

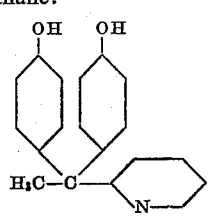

7. A process for the production of 4,4'-disubstituted-diphenyl-pyridyl-methanes having the following structural formula:

wherein X is a radical taken from the class consisting of hydroxy, methoxy, acetoxy and NH₂; Y is a radical taken from the class consisting of H, CH₃, C₃H₇, phenyl, benzyl and methoxy; and Z is a radical taken from the class consisting of H and CH₃, which comprises mixing an aromatic compound taken from the class consisting of phenols, aniline, acetoxybenzenes and methoxy-benzenes, said aromatic compound having a hydrogen atom in the p-position, with a nitrogen compound taken from the class consisting of pyridine ketones, pyridine aldehydes, their acetals, and their bisulphite addition products and the free acids corresponding thereto, adding thereto a dehydrating agent, whereby a reaction takes place forming said 4,4'-disubstituted-diphenyl-pyridine-methanes.

References Cited in the file of this patent

Lenart: Chem. Abst., vol. 9, p. 2880 (1915).

Karrer: "Org. Chem." (Elsevier, 2nd Eng. ed.), pp. 445–61, 409–13 (1946).